Oct. 9, 1962 C. J. FITCH 3,057,529

TAPE TRANSPORT APPARATUS

Filed Sept. 20, 1960

INVENTOR
CLYDE J. FITCH

BY Leo J. Aubel
ATTORNEY

United States Patent Office
3,057,529
Patented Oct. 9, 1962

3,057,529
TAPE TRANSPORT APPARATUS

Clyde J. Fitch, Endicott, N.Y., assignor to International Business Machines Corporation, New York, N.Y., a corporation of New York Filed Sept. 20, 1960, Ser. No. 57,252
2 Claims. (Cl. 226—49)

Figure 1:
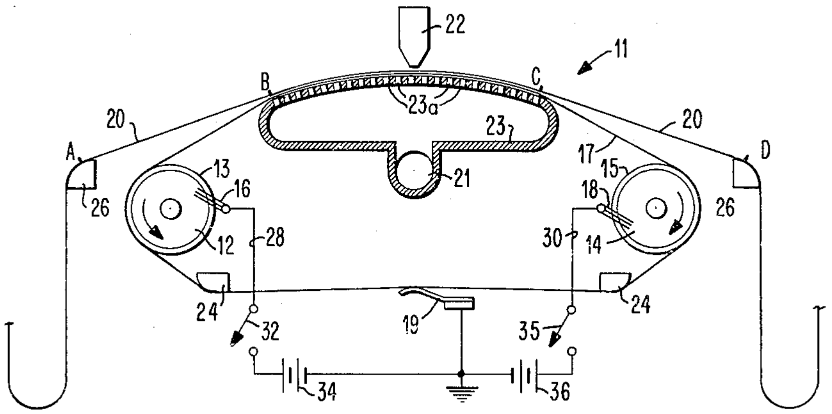

This invention relates to a tape transport apparatus, and more particularly to apparatus utilizing a band driven by electrostatic clutches as a tape transport and in which air suction means are provided for increasing the friction between the tape and the band.

The speed of feeding tapes in conventional magnetic tape transport apparatus is limited by the mass of the driving apparatus; also, the speed must be kept within certain limits since the tape stretches due to acceleration forces. Various schemes have been devised to provide a high speed tape transport apparatus for driving the tape through the position of a magnetic head. In particular, one scheme utilizes two spaced capstans each capstan having a work passage formed therein by means of which suction or compressed air can be communicated through the capstan passages to the underside of the tape. The mass of the capstans is relatively high so that the speed of the foregoing device is limited. Further, as the speed of said device is increased, the tape is undesirably stretched as it passes through the position of the magnetic head. This is caused by the fact that the driving force on the tape is effective at relatively widely separated points on the tape thereby causing the tape to stretch in the space between the capstans where the magnetic head is located. Consequently, unless the speed of the tape is reduced, the tape will be stretched out of its normal form or alignment and the magnetic head will not process information to or from the tape accurately.

Accordingly, it is a principal object of the present invention to provide high speed tape transport apparatus.

It is another object of the invention to provide a high speed tape transport apparatus in which the driven tape maintains its shape or alignment at the magnetic head location.

It is another object of the invention to provide a tape transport apparatus including air suction assist means to maintain friction between the tape and a driving element.

It is another object of the invention to provide a high speed tape transport apparatus having driving elements of low mass.

It is still another object of the invention to provide a high speed transport apparatus utilizing electrostatic clutches as a driving member.

It is yet another object of the invention to provide a high speed transport apparatus utilizing a band driven by a pair of electrostatic clutches for transmitting the driving force to said tape.

In one embodiment, the invention comprises a pair of spaced electrostatic clutches. An endless perforated band is positioned to encircle the clutches to be driven thereby. A portion of the tape to be transported is positioned on the upper portion of the band. An air suction or vacuum developing means is positioned between the clutches and is mounted beneath the portion of the band on which the tape is positioned. In operation, one or the other of the clutches is actuated to drive the band. At the same time, the air suction apparatus is activated such that it tends to draw the tape onto the perforated band to thereby provide suitable friction between the tape and the band such that the tape is driven by the band.

The foregoing and other objects, features and advantages of the invention will be apparent from the following more particular description of a preferred embodiment of the invention, as illustrated in the accompanying drawings.

In the drawings:

FIG. 1 is a schematic view of tape transport apparatus according to the invention.

Figure 1A:
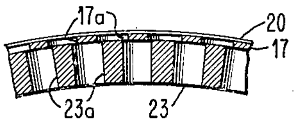

FIG. 1*a* is an enlarged view, partly in section, of a portion of the air suction apparatus of FIG. 1.

Referring to the drawings, FIG. 1 shows a tape transport apparatus 11 according to the present invention. Transport 11 includes a pair of spaced electrostatic clutches 13 and 15. Clutches 13 and 15 are of similar construction and include respective rotors 12 and 14, which rotors are of any suitable semi-conductive material, which are driven to continuously rotate in relatively opposite directions, as indicated by the arrows. An endless perforated spring steel band 17 encircles the two continuously rotating clutches making approximately a 120 degree contact with each clutch. Band 17 is arranged around guides 24. A grounded leaf spring 19 contacts the lower center of the band 17 to provide an electrical reference for band 17, and also applies a small amount of resilient tension to maintain the band taut on the clutches 13 and 15.

As is known, the operation of electrostatic clutches depends upon the electroadhesive forces between a conductive member and a cooperating semiconducting member. The electroadhesive effect between conductors and semiconductors is well known in the art and there are a number of materials that will exhibit electroadhesion. Rotor 12 of clutch 13 is connected through brush 16, lead 28 and through a switching means symbolically indicated as a mechanical on-off switch 32 to a source of potential indicated as a battery 34. It will, of course, be understood that the switching means may be an electronic device of any suitable known type. Likewise, rotor 14 of clutch 15 is connected through brush 18, lead 30, and through a switching means 35 to a source of potential indicated as a battery 36.

It will be appreciated that when switching means 32 is electrically closed, a potential will be provided to rotor 12 of clutch 13 and an electroadhesive force will be effected between rotor 12 and band 17 to effectively adhere to rotor 12 and hence, causing band 17 to start moving in the direction of the rotation of rotor 12. Likewise, when switching means 35 is closed, a potential will be provided to rotor 14 of clutch 15 and an electroadhesive force will be effected causing band 17 to start rotating in the direction of rotation of rotor 14.

A primary advantage of an electroadhesive clutch over other similar devices is rapid electrical response time in the order of microseconds. Electroadhesive clutches also have the advantages of low operating current in the order of a milliampere at 150 volts, and of small size in relation to the amount of torque output.

Clutches 13 and 15, and the band 17 may be lubricated by means of a suitable lubricant such as silicone, as described in the copending application S.N. 703,791, now Patent No. 3,002,596, to C. J. Fitch for "Electrostatic Clutch" which application is assigned to the same assignee as the present invention.

An air suction or vacuum developing means 21 of any suitable known type is mounted or supported within a frame 23. Frame 23 is positioned beneath the band 17 and the band lies on or moves over the frame 23. The upper portion of frame 23 has apertures or ports **23*a* formed therein. It will be appreciated that the ports 23*a* are formed on the portion of the frame 23 on which the band 17** lies.

A magnetic tape 20, to be transported, is positioned to frictionally contact the portion of the perforated steel band 17 lying on frame 23. Tape 20 is arranged around guide shoulders 26. A magnetic head 22, for processing information into or from the tape, is mounted immediately above the frame 23, and is positioned adjacent the tape.

The air suction developing means 21 provides a suction to aid in maintaining frictional adhesion between band 17 and tape 20. As clearly seen in the enlarged view of FIG. 1*a* which shows a portion of frame 23, ports 23*a* in frame 23 are relatively larger than the perforations 17*a* formed on band 17. Thus, as seen from FIG. 1*a*, even it the band 17 is in position in which the solid portions of the band completely overlap the ports 23*a* there will still be spaces around the edges of the solid portions to provide an air suction to the tape 20; in other words, ports 23*a* will always register with certain ones of the perforations 17*a*.

In operation, assume band 17 is to be driven to the right, as oriented in FIG. 1, to drive tape 20 in a first direction (also to the right, as oriented in FIG. 1). An external signal is provided to clutch 15, represented by the closing of switching means 35; and electroadhesive effect is thus provided between continuously rotating rotor 14 and band 17 causing band 17 to move and drive tape 20 to the right.

It should be appreciated that rotor 12 of clutch 13 is rotating in a relatively opposite direction; however, there is no electroadhesive force effective between rotor 12 and band 17 during this period so that the band 17 merely slides over the surface of rotor 12.

An air suction of approximately one-half atmosphere is supplied through ports 23*a* and perforations 17*a* to tape 20. This reduces pressure within frame 23 and causes the external atmospheric pressure over tape 20 to force the tape 20 onto the steel band 17. As noted above, regardless of the position of the band 17 on frame 23, there will be some air suction applied to tape 20. Friction between band 17 and tape 20 will cause the tape 20 to move with band 17.

The mass of the steel band and of the magnetic tape is low and, therefore, fast acceleration in the order of 1 millisecond from a stopped to a full speed condition is possible.

It should be noted that the driving force on tape 20 is effected by band 17 between points B and C. Although stretching of the magnetic tape will occur between points A and B, or between points C and D depending upon whether tape 20 is being moved in a first direction, i.e., to the right, as oriented in FIG. 1 or in a second or opposite direction respectively, the stretched portion of tape 20 will, however, have assumed its normal form or alignment by the time it moves under the magnetic head 22.

Since the electrostatic clutches are capable of rotating sufficiently fast to impart a surface speed of about 300 inches per second to band 17 and thus to tape 20, this provides a very rapid means of processing information on the tapes. Accordingly, since the tape can be moved fast and with no alteration or stretching of the tape under the read head, the limitation as to speed is extended considerably over that shown in the prior art.

To stop the tape 20, external sources or intelligence data on the tape itself, as read by magnetic head 22, may provide a signal to open switching means 35 and to deenergize clutch 15, that is, remove the electroadhesive effect between rotor 14 and band 17. At the same time, a short pulse of potential is impressed on clutch 13 which would be represented in FIG. 1 by momentarily closing switch 32. The short pulse provides a momentary electroadhesive effect between band 17 and rotor 12, which rotor is rotating in a relatively opposite direction to rotor 14 of clutch 15, causing band 17 to brake quickly.

Friction between band 17 and frame 23 prevents the band from creeping or moving when both clutches are deenergized. The decleration or stopping time is in the order of 1 millisecond from full speed to a stopped condition.

Rotor 12 of clutch 13 is arranged to rotate in a relatively opposite direction to rotor 14 of clutch 15 to drive the band 17, and thus tape 20 in a second or opposite direction, that is, to the left, as oriented in FIG. 1. When clutch 13 is the driving unit, clutch 15 provides a braking action as required, similarly as described above for clutch 13.

In addition to providing high information processing rate, tape apparatus according to the invention provides a means of handling the tape smoothly and firmly to assure that no tapes will be worn out or damaged by the mechanism.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic tape transport apparatus comprising, in combination, a pair of spaced electrostatic clutches, the first of said clutches having a rotor driven to continuously rotate in a first direction and a second of said clutches having a rotor driven to continuously rotate in a relatively opposite direction, a perforated band encircling said rotors, means for selectively providing an electrical potential between said band and said rotors for selectively developing an electroadhesive force therebetween for causing said band to rotate in a path around said rotor, the tape to be transported being arranged to frictionally contact said band along a selected portion of said band path, an air suction developing means including ports formed therein for registering with the perforations in said band along said selected portion of said band path to thereby maintain a suction force on said tape to supplement the friction between said band and said tape, and said band and hence said tape being driven in one direction when a potential is selectively applied to one rotor and in the opposite direction when a potential is selectively applied to the other rotor.

2. A magnetic tape transport apparatus comprising, in combination, a pair of spaced electrostatic clutches, the first of said clutches having a rotor driven to continuously rotate in a first direction and a second of said clutches having a rotor driven to continuously rotate in a relatively opposite direction, a perforated band encircling said rotors, means for selectively providing an electrical potential between said band and said rotors for selectively developing an electroadhesive force therebetween for causing said band to rotate in a path around said rotors, the tape to be transported being arranged to overlie said band along a portion of said band path, an air suction developing device, means for supporting said air suction device, said supporting means having an area contacting said band along said band path portion which the tape overlies, and said supporting means having ports formed therein for registering with the perforations in said band to thereby maintain a suction force on the tape to supplement the friction between band and the tape, said band and hence the tape being driven in one direction when a potential is selectively applied to one rotor and in the opposite direction when a potential is selectively applied to the other rotor. said band being braked for stopping the tape by removing the potential from the rotor driving said band and providing a momentary potential to the other rotor, and said supporting means providing friction between itself and said band to eliminate creeping of said band when both said clutches have no potential applied thereto.

References Cited in the file of this patent

UNITED STATES PATENTS

| | | |
|---|---|---|
| 2,772,880 | Garrett | Dec. 4, 1956 |
| 2,831,678 | MacNeill | Apr. 22, 1958 |